W. E. BOCK.
WORM GEAR.
APPLICATION FILED OCT. 16, 1916.
1,320,372.
Patented Nov. 4, 1919.
2 SHEETS—SHEET 1.
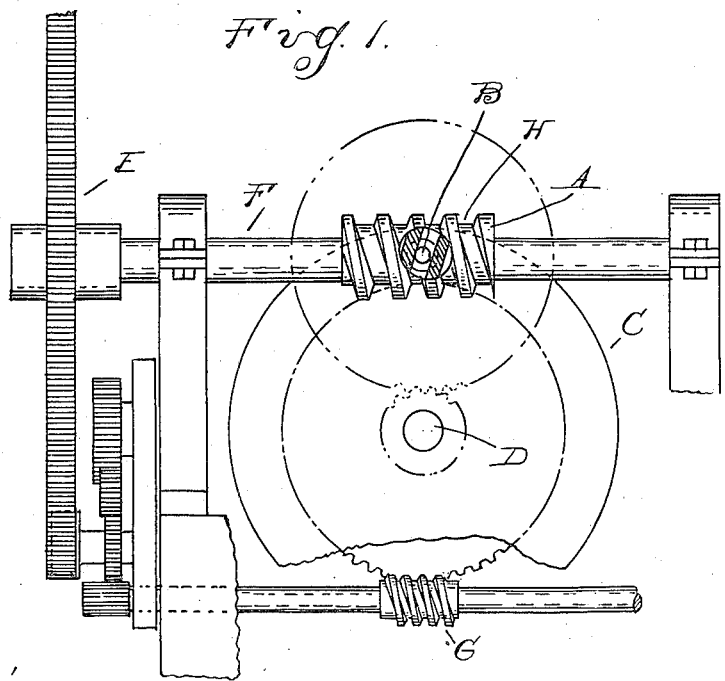
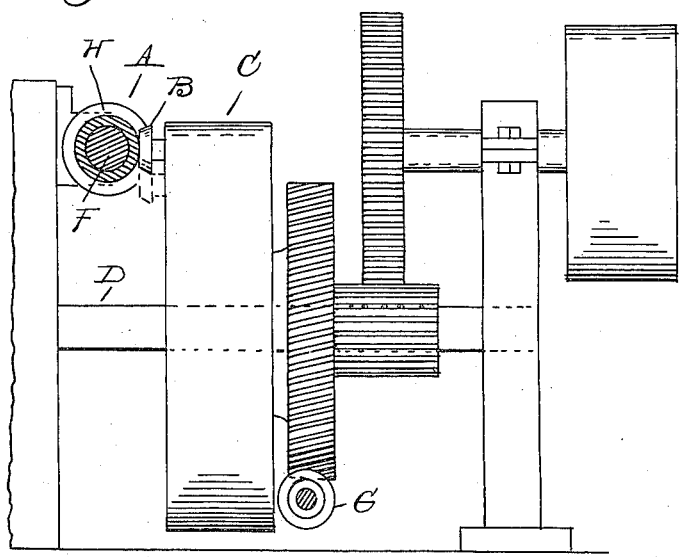
Inventor
William Emil Bock
By Whittemore Hulbert & Whittemore
Attorneys

W. E. BOCK.
WORM GEAR.
APPLICATION FILED OCT. 16, 1916.

1,320,372.

Patented Nov. 4, 1919.
2 SHEETS—SHEET 2.

Inventor
William Emil Bock

By Whittemore Hulbert & Whittemore
Attorneys

UNITED STATES PATENT OFFICE.

WILLIAM EMIL BOCK, OF TOLEDO, OHIO, ASSIGNOR TO THE BOCK WORM GEAR COMPANY, OF CLEVELAND, OHIO, A CORPORATION OF OHIO.

WORM-GEAR.

1,320,372.          Specification of Letters Patent.          Patented Nov. 4, 1919.

Original application filed May 11, 1914, Serial No. 837,933. Divided and this application filed October 16, 1916. Serial No. 125,885.

*To all whom it may concern:*

Be it known that I, WILLIAM EMIL BOCK, a citizen of the United States of America, residing at Toledo, in the county of Lucas and State of Ohio, have invented certain new and useful Improvements in Worm-Gears, of which the following is a specification, reference being had therein to the accompanying drawings.

The invention relates to worm gears of that type adapted for coöperation with gears having roller teeth. It is the object of the invention to obtain a construction in which the spiral bearing face of the worm maintains a true rolling contact with the roller teeth from the point of entering engagement to the point of disengagement. This application is a divisional of an original application filed by me on May 11, 1914, Serial No. 837,933.

In the drawings:—

Figure 1 is a side elevation of the worm, in connection with the cutter and coöperating mechanism for controlling the same;

Fig. 2 is a view at right angles to Fig. 1;

The particular type of worm gearing to which my improved construction is applicable is that in which the worm wheel is provided with roller teeth having their axes parallel to the axis of the wheel and projecting laterally from the face of the wheel. The worm is arranged at the side of the worm gear with its axis transverse to the gear axis, and in operation the roller teeth successively engage the spiral face of the worm, a plurality of the rolls being in engagement with the same face at the same time. By reason of the circular orbit of the roller teeth, the direction of movement varies in angular relation to the axis of the worm, and consequently the successive convolutions of the spiral are not of the same pitch. Furthermore, the rolls not only move longitudinally of the worm but transversely with respect to the axis thereof and also in and out with respect to the periphery of the worm. This variation renders the formation of the worm by methods heretofore employed exceedingly difficult, but by my improved method the difficulties are overcome and the work may be performed with extreme accuracy.

Figure 3:
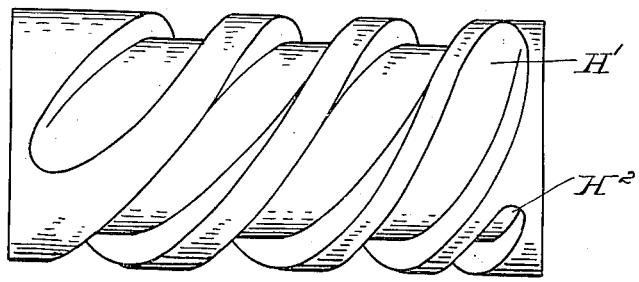
Fig. 3 is a side elevation of the worm in modified construction.

As shown in Fig. 1, A is the worm, formed with its spiral face of progressively changing pitch, so that the distance between successive convolutions is correspondingly changed. To cut the worm in this form it is necessary that the cutting tool should move not only longitudinally with respect to the axis of the worm during the rotation thereof, but also laterally. This I accomplish in a simple manner by mounting the rotary cutter B upon a suitable carrier, such as the disk C, which rotates about a center D, the radius of the path through which the cutter passes corresponding to the radius of the gear in coöperation with which the worm is to be used. The disk C is also rotated simultaneously with the rotation of the worm blank and in predetermined timed relation thereto, as by means of timed connecting gearing E between the worm arbor F and mechanism, such as worm gearing G, for rotating the disk. As a consequence the groove H cut by the rotary cutter B will be of a width corresponding to the diameter of said cutter, but the faces of said groove will vary in pitch, as above described.

Where desired, worms may be cut by my improved method so as to be provided with a plurality of separate grooves, such as H', H² Fig. 3. These are cut in the same manner as previously described and in use will coöperate with the roller teeth of the gear to maintain a larger number of said teeth in action at the same time.

Figure 4:
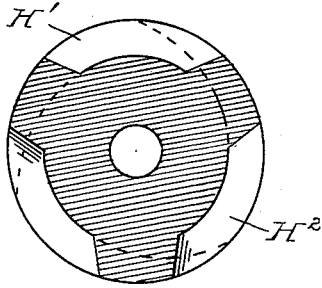
Fig. 4 is a cross section.

As indicated in Fig. 4, the grooves in the worm progressively increase in depth from the point of entrance toward the longitudinal center and then decrease in depth from this point to the point of disengagement.

What I claim as my invention is:

1. A cylindrical worm provided with a spiral groove of uniform width at its bottom, the opposite faces of said groove being of progressively changing pitch.

2. A cylindrical worm provided with a plurality of separate grooves having bottoms of constant width, the spiral faces of said grooves being of progressively changing pitch from one end to the opposite end thereof.

3. A cylindrical worm having a spiral groove of progressively changing pitch and of changing depth from the point of entrance to the point of termination.

4. A cylindrical worm provided with a spiral groove forming a plurality of convolutions, said groove having a bottom of constant width and of changing depth from the point of entrance to the point of termination.

5. A cylindrical worm provided with a spiral groove of changing depth from the point of entrance to the point of termination.

In testimony whereof I affix my signature.

WILLIAM EMIL BOCK.